C. BARTH.
METHOD OF MACHINE CUTTING SPUR AND HELICAL WHEELS.
APPLICATION FILED JULY 19, 1920.
1,429,398.
Patented Sept. 19, 1922.
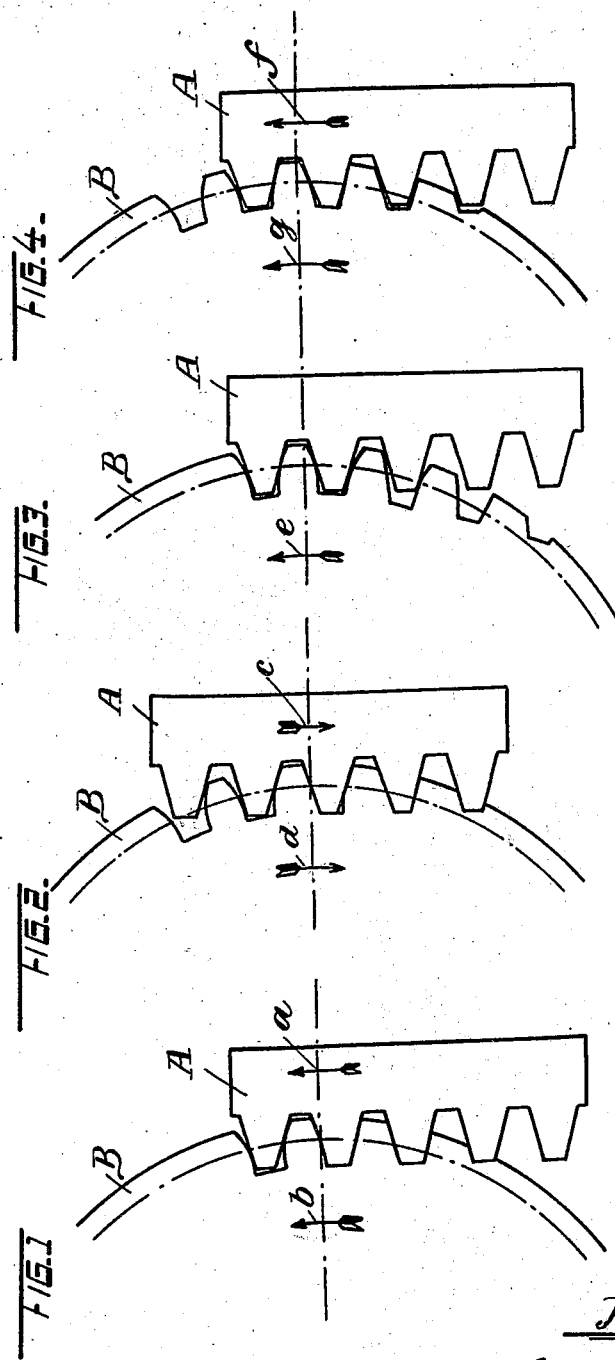
Inventor:
Curt Barth Patented Sept. 19, 1922.

1,429,398

UNITED STATES PATENT OFFICE.

CURT BARTH, OF HAMBURG, GERMANY.

METHOD OF MACHINE-CUTTING SPUR AND HELICAL WHEELS.

Application filed July 19, 1920. Serial No. 397,521.

*To all whom it may concern:*

Be it known that I, Dr. CURT BARTH, a citizen of the State of Germany, residing at Hamburg, Klostertor 8, Germany, have invented certain new and useful Improvements in or Relating to a Method of Machine-Cutting Spur and Helical Wheels, of which the following is a specification.

My invention relates to a method of machine-cutting spur and helical wheels by aid of a rack-shaped tool according to the rolling-off process. I am aware that the method of machine-cutting spur and helical wheels by means of a rack-shaped tool according to the rolling-off process is already known; it being commonly the practice to carry out this said process in two different ways. In the first, a tool is employed having the cross section of only a single tooth of a rack, which is then caused to cut one tooth space after another till finished. Assuming the tool, apart from its reciprocating cutting action, to be otherwise stationary, the work piece must be caused to execute a rotatory and a rectilinear motion, during which a tooth space is cut till finished, upon which the work piece carries out a similar return motion, whereupon the tool is fed forward for the distance of a pitch, when the forward motion for the cutting of the second tooth space may be initiated. Now, this method embodies the drawback that a comparatively large movement is required for the cutting of a single tooth space, and therefore consumes much time.

It will be found that the work may be accomplished in considerably less time if, in the place of a tool possessing the cross sectional area of but a single tooth of a rack, a tool be employed the cross section of which corresponds to a toothed rack of fairly long dimension. In such an event the cutting of the toothed wheel may be carried on continuously; the tool being adapted to roll-off along the rotating work piece besides executing its reciprocating cutting movement. Each time the work piece rotates for the distance of a pitch, a tooth space will have been machined, as also each single tooth of the rack-shaped tool will be adapted to produce a tooth space. In the case of such a working process the tools would, theoretically speaking, have to be of such a length, that the number of their teeth will at least correspond to the number of tooth spaces to be formed in the toothed wheel.

Again, if two or more such tools be employed which, disposed oppositely along the periphery of the toothed wheel are caused to enter into action contemporaneously, then each of these tools would only need to embody so many teeth as would be required to correspond to those of the respective section of the wheel (say, the half, third, etc.) about to be manufactured.

In the manufacture of big toothed wheels it will prove expedient, when employing this process in order to prevent the length of the tool from becoming too big, to effect a reversal each time a number of teeth, corresponding to the length of the tool, has been completed, and this by temporarily bringing the tool out of engagement with the work-piece, and while causing either the tool or else the work-piece to stand still, feeding this other part forward for a distance till the first tooth of the work-piece will be able to engage the next space to be machined.

I am further aware that machine tools have already been constructed operating with multi-toothed tools in the case of which the aforesaid reversal is effected automatically, and where in order to obviate the necessity of providing racks of very big lengths, the reversal is effected each time a tooth space has been cut, so that after tool and work-piece have rolled-off for the amount of an entire pitch, the tool will be shifted back into the initial position assumed during the previous working position, while the work-piece retains its position.

However, machine tools of the last-mentioned kind require extremely intricate gear arrangements, for in order to secure an accurately true engagement, it will prove necessary to disengage tool and work-piece after each working operation, then to shift either of these two parts, and finally to execute the feed movement.

To carry out this movement there are required intricate gearings, and even then special precautionary measures would have to be taken to secure the reversal for the proper distance required.

My present invention is intended to obviate this drawback by the provision of an improved process according to which use is likewise made of a rack-like tool, as there also is caused to take place a rolling-off action between toothed rack and work-piece relatively to each other, but in the case of which, with the view to effecting the reversal, rack and work-piece are primarily caused to execute a conjoint return rolling-off action, whereupon the work-piece is fed forward for the space of a pitch, or a multiple thereof. A process of this description may be carried through with great accuracy for the reason that the extent of the return rolling-off movement is no longer of any consequence. Any inaccuracies arising during this movement are of no importance; all that is required to be accurate is the feed movement given to the work-piece for the distance of a pitch or a multiple thereof. Now a feed action of this character may be secured with reliable exactitude and very simple means by aid of the well-known type of dividing devices. This improved process in addition affords the possibility of eliminating the influence of the lost motion in a very simple manner by carrying out the return rolling-off movement for a little more than a whole pitch or a multiple thereof and then, after feeding the work-piece forward, carrying out a forward rolling-off which will remove the said lost motion, i. e. will cause the whole gearing to again engage those parts with which it is intended to be in engagement during the actual cutting operation, whereupon the working operation proper may commence. In order to save time, it will be found expedient to carry out this forward feed for the purpose of eliminating the lost play at the increase speed available for the return movement.

An embodiment of a form of executions of the subject matter of this invention is shown by way of example in the accompanying drawing, in which—

Fig. 1 is a diagrammatic view showing the positions assumed by tool and work piece relatively to each other at the beginning of the working stroke.

Fig. 2 a similar view of these parts on the termination of the working stroke.

Fig. 3 a similar view showing the relative positions assumed by tool and work-piece on the completion of the return, and Fig. 4 a similar view showing the position assumed by the tool after it has been retracted, while the work-piece has been fed forward.

The tool A which, regarded in the cross section, represents a toothed rack, moves at right angles relatively to the plane of the drawing for the purpose of executing the cutting action. During the working stroke, the tool in addition executes a forward motion in the direction indicated by the arrow $a$ (Fig. 1) while at the same time the work-piece B effects a rotation in the direction of the arrow $b$, so that the several teeth of tool A will be caused to machine the tooth space in the manner known per se. The working stroke must be continued until tool and work-piece will have at least rolled off for the space of an entire pitch. However, the arrangement may, of course, also be such that these two members will be caused to roll-off for a distance comprising a plurality of pitches; it will only in such a case prove expedient that the rolling-off action be always effected for an entire multiple of the pitch. It will be observed that in this way one or even more tooth spaces may be machined. Up to this point, the working operation is known.

Now assuming that the feed action has taken place for only the distance of a single pitch, then, on the working stroke being completed, tool and work-piece will assume the position shown in Fig. 2. Upon this, the return movement is initiated, which is preferably carried out at an increased speed. According to my invention the return movement is effected in such a manner that tool and work-piece will primarily effect a return rolling-off movement, i. e. will move in the direction indicated by the arrows $e$ and $d$ in Fig. 2. The extent of this return movement may be as large as desired. However, it must at least be equal to the size of a pitch. Preferably, it will be selected to be somewhat larger than a pitch or even somewhat larger than a multiple thereof, in which case the portion of the return rolling-off movement exceeding the amount of a pitch or a multiple thereof, is made use of in a manner hereinafter to be explained, for the purpose of compensating the lost motion. The position assumed by work-piece and tool after the return rolling-off movement has been terminated is indicated in Fig. 3. For mere convenience it is in this case also assumed that the return rolling-off action has only been effected for slightly more than a pitch. Hence, the position here shown essentially corresponds to that disclosed in Fig. 1, with the sole difference of work-piece and tool being rotated somewhat further back.

After the return rolling-off action has terminated, the tool which has meanwhile been retracted, is brought to a stop, and the work-piece fed forward in the direction shown by the arrow $e$ in Fig. 3; the feeding forward extending over as many pitches as will correspond to the amount of the previous back rolling-off action. If then, according to Fig. 3 the back rolling-off action only extended over a little more than a pitch, then the work-piece must be fed forward for the space of a whole tooth. The position of the tool will then be the same after the feeding forward of the work-piece as previous thereto, and only the work piece will have been moved forward for a corresponding number of teeth, one tooth in the form of execution illustrated. This particular position of the tool is disclosed in Fig. 4. With the two bodies in intimate contact, the forward rolling-off action of work-piece and tool in the direction indicated by the arrows *f—g* now commences. The first portion of this forward movement may preferably be utilized for the purpose of eliminating the lost motion, so that the tool will not yet enter into action; in fact there merely takes place a forward rolling-off of work-piece and tool; the several devices again making contact with those surfaces which are also in mutual engagement when the tool is in active operation. As soon as the forward feed-action has attained the degree for the extent of which the return movement exceeded the full measure of a pitch, work-piece and tool will again have assumed the position shown in Fig. 1, and the next stroke which is the actual working stroke now sets in.

The succession in which the movements follow each other may also be so arranged that the idle stroke required to eliminate the lost motion, is carried out before the work-piece is fed forward, so that the successive movements will be: working stroke, return movement, preliminary idle stroke to eliminate the lost motion, feeding forward of the work-piece; whereupon these separate stages of the process repeat themselves.

The return rolling-off movement and the feeding action are effected in the well-known manner at a geater speed than the working stroke. According to the invention, however, and in order to secure a saving in time, not only the return movement, but the entire idle stroke are carried out at an increased speed, and therefore also the forward rolling-off action effected to eliminate the lost motion. The gearings required to carry through this last mentioned measure are of the simplest; all that is required is to somewhat retard the reversal from quick speed to slow speed, and to provide the quick speed with a reversing gearing.

In comparison with the known processes the present process embodies the substantial advantage that, excepting during the feed movements of the work-piece effected by the dividing devices working with due precision, there do not take place any mutually independent movements of work-piece and tool, but only simple reciprocating rolling-off movements which may be carried through with the simplest kind of gear, without any liability of an inaccurate engagement being effected.

The process is equally applicable for the manufacture of spur wheels, as well as of helical wheels. In the latter case all that is required is to set the tool in accordance with the angle of inclination of the teeth.

The mutual rolling-off action is indicated in the diagrams disclosed in the drawing in a manner as though the work-picce executed a rotary and the tool a retilinear motion. It is, of course, possible—and this will preferably be the case when carrying the present improved construction into practical effect—to cause the tool apart from its reciprocating cutting action, to remain stationary and instead giving the work-piece, in addition to its rotary motion, a progressive motion. In such a contingency the feeding forward of the work-piece for the extent of a pitch will then be effected in such a manner that the rectilinear progressive movement of the work-piece will be brought to a stop, and the rotary movement thereof continued, till the work-piece has been fed forward for the space of a pitch.

What I claim is:

1. A process for machine cutting spur and helical wheels by means of a rack-like tool and in which the tool and the work-piece to be cut carry out a rolling-off process relatively to each other, consisting in a complete working stroke being composed of the following operations: firstly, a forward rolling-off movement of the tool and the work-piece relatively to each other for the distance of a multiple of a pitch, at least one pitch, the tool in the course of this movement machining the tooth spaces, secondly, a backward rolling-off action of the said tool and work-piece relatively to each other for any desired extent, which shall in any case, however, and at least be of the magnitude of a pitch, thirdly, a bringing of the two parts, namely tool and work-piece, out of engagement, and, while the one of same is at a stand-still, a forward feed-movement of the other for the distance of a multiple of a pitch, at least one pitch, fourthly, a re-engaging of the tool and work-piece, and a forward rolling-off action of the same relatively to each other for the extent that the backward rolling-off action has exceeded the amount of a multiple of a pitch, for the purpose of eliminating the effect of the lost motion, substantially as described.

2. A process for machine cutting spur and helical wheels by means of a rack-like tool and in which the tool and the work-piece to be cut carry out a rolling-off process relatively to each other, consisting in a complete working stroke being composed of the following operations: firstly, a forward rolling-off movement of the tool and the work-piece relatively to each other for the distance of a multiple of a pitch, at least one pitch, the tool in the course of this movement machining the tooth spaces, secondly, a backward rolling-off action of the said tool and work-piece relatively to each other for any desired extent, which shall in any case, however, and at least be of the magnitude of a pitch, thirdly, a forward rolling-off action for the extent that the backward rolling-off action has exceeded the amount of a multiple of a pitch, fourthly, a bringing of the two parts, namely tool and work-piece, out of engagement, and while the one of same is at a stand-still, a forward feed movement of the other for the distance of a multiple of a pitch, at least one pitch, and re-engaging same.

3. A process for machine cutting spur and helical wheels by means of a rack-like tool and in which the tool and the work-piece to be cut carry out a rolling-off process relatively to each other, consisting in a complete working stroke being composed of the following operations: firstly, a forward rolling-off movement of the tool and the work-piece relatively to each other for the distance of a multiple of a pitch, at least one pitch, the tool in the course of this movement machining the tooth spaces, secondly, a backward rolling-off action of the said tool and work-piece relatively to each other for any desired extent, which shall in any case, however, and at least be of the magnitude of a pitch, thirdly, a bringing of the two parts, namely tool and work-piece, out of engagement, and, while the one of same is at a stand-still, a forward feed-movement of the other for the distance of a multiple of a pitch, at least one pitch, fourthly, a re-engaging of the tool and work-piece and a forward rolling-off action of the same relatively to each other for the extent that the backward rolling-off action has exceeded the amount of a multiple of a pitch, for the purpose of eliminating the effect of the lost motion, the entire empty stroke, comprising the backward rolling-off action, the feed action, as also the forward rolling-off action effected to eliminate the lost motion, being carried out at a greater speed than the working stroke.

4. A process for machine cutting spur and helical wheels by means of a rack-like tool and in which the tool and the work-piece to be cut carry out a rolling-off process relatively to each other, consisting in a complete working stroke being composed of the following operations: firstly, a forward rolling-off movement of the tool and the work-piece relatively to each other for the distance of a multiple of a pitch, at least one pitch, the tool in the course of this movement machining the tooth spaces, secondly, a backward rolling-off action of the said tool and work-piece relatively to each other for any desired extent, which shall in any case, however, and at least be of the magnitude of a pitch, thirdly, a forward rolling-off action for the extent that the backward rolling-off action has exceeded the amount of a multiple of a pitch, fourthly, a bringing of the two parts, namely tool and work-piece, out of engagement, and while the one of same is at a stand-still, a forward feed movement of the other for the distance of a multiple of a pitch, at least one pitch, and re-engaging same, the entire empty stroke comprising the backward rolling-off action, the forward rolling-off action for the extent that the backward-rolling-off action has exceeded the amount of a multiple of a pitch and the feed action, being carried out at a greater speed than the working stroke.

In testimony whereof I have affixed my signature.

Dr. CURT BARTH.